United States Patent
Olson et al.

(10) Patent No.: US 9,014,825 B2
(45) Date of Patent: Apr. 21, 2015

(54) SYSTEM AND METHOD FOR SEQUENTIALLY DISTRIBUTING POWER AMONG ONE OR MORE MODULES

(75) Inventors: Chad L. Olson, Santa Clara, CA (US); Joseph B. Vandem Wymelenberg, Los Altos, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 678 days.

(21) Appl. No.: 12/485,745

(22) Filed: Jun. 16, 2009

(65) Prior Publication Data
US 2014/0312690 A1    Oct. 23, 2014

(51) Int. Cl.
G05B 11/01    (2006.01)
G06F 1/24    (2006.01)
G06F 1/32    (2006.01)

(52) U.S. Cl.
CPC ............... *G06F 1/24* (2013.01); *G06F 1/3203* (2013.01); *G06F 1/329* (2013.01); *Y02B 60/144* (2013.01)

(58) Field of Classification Search
CPC ............ G05B 19/042; G05B 19/0423; G05B 19/0426; G05B 19/054; G05B 19/056; G06F 1/26; G06F 1/28; G06F 1/30; H02M 3/156; H02M 2001/008
USPC ........ 700/11, 22, 23; 323/222, 266, 272, 282, 323/318; 713/300, 340
See application file for complete search history.

(56) References Cited

U.S. PATENT DOCUMENTS

| | | | |
|---|---|---|---|
| 6,333,650 B1 * | 12/2001 | Amin et al. | 327/143 |
| 6,429,706 B1 * | 8/2002 | Amin et al. | 327/143 |
| 6,975,494 B2 | 12/2005 | Tang et al. | |
| 7,002,325 B2 * | 2/2006 | Harris et al. | 323/272 |
| 7,228,446 B2 | 6/2007 | Jorgenson et al. | |
| 7,266,709 B2 * | 9/2007 | Chapuis et al. | 713/300 |
| 7,363,525 B2 | 4/2008 | Biederman et al. | |
| 7,385,435 B2 | 6/2008 | Pham et al. | |
| 7,394,445 B2 * | 7/2008 | Chapuis et al. | 345/89 |
| 7,424,643 B2 | 9/2008 | Atri et al. | |

(Continued)

OTHER PUBLICATIONS

Unknown Author, "Flexible Power-Up Sequencing for LCDs Using a Programmable Power Manager IC", "A Lattice Semiconductor White Paper", Apr. 1, 2005, Publisher: Lattice Semiconductor Corporation, Published in: US.

(Continued)

*Primary Examiner* — Charles Kasenge
(74) *Attorney, Agent, or Firm* — North Weber & Baugh LLP

(57) ABSTRACT

A programmable power distributing sequencer including a plurality of internal regulators, an internal memory adapted to store a user programmable script including instructions for sequentially enabling and disabling the regulators, and a controller adapted to enable and disable the regulators based on the script. The controller may receive the user programmable script from a programming source, such as an applications processor, an external memory, or external programming device. Before using the user programmable script, the controller may execute a default script stored in the internal memory to initially power up the programming source. The sequencer may further include an external port for similarly controlling one or more external regulators. The port may also be used to connect multiple sequencers together, such as in a cascaded, hierarchical, and/or redundant manner. Additionally, the sequencer may include a fault detection module for detecting faulty operating regulators.

33 Claims, 12 Drawing Sheets

(56) References Cited

U.S. PATENT DOCUMENTS

| | | | |
|---|---|---|---|
| 7,456,617 B2* | 11/2008 | Chapuis et al. | 323/267 |
| 7,493,504 B2* | 2/2009 | Chapuis | 713/300 |
| 7,533,282 B2 | 5/2009 | Ohneda et al. | |
| 7,533,283 B2 | 5/2009 | Fung et al. | |
| 7,646,382 B2* | 1/2010 | Chapuis et al. | 345/211 |
| 7,679,217 B2* | 3/2010 | Dishman et al. | 307/64 |
| 7,685,320 B1* | 3/2010 | Wishneusky | 710/3 |
| 7,694,163 B1* | 4/2010 | Bisbee | 713/340 |
| 7,782,029 B2* | 8/2010 | Chapuis et al. | 323/267 |
| 7,836,322 B2* | 11/2010 | Chapuis et al. | 713/340 |
| 8,086,874 B2* | 12/2011 | Chapuis et al. | 713/300 |
| 2004/0090219 A1* | 5/2004 | Chapuis | 323/318 |
| 2004/0093533 A1* | 5/2004 | Chapuis et al. | 714/22 |
| 2005/0200344 A1* | 9/2005 | Chapuis | 323/282 |
| 2005/0289373 A1* | 12/2005 | Chapuis et al. | 713/300 |
| 2006/0015616 A1* | 1/2006 | Chapuis et al. | 709/225 |
| 2006/0174145 A1* | 8/2006 | Chapuis et al. | 713/300 |
| 2007/0234095 A1* | 10/2007 | Chapuis et al. | 713/340 |
| 2008/0010474 A1 | 1/2008 | Chapuis | |
| 2008/0052551 A1* | 2/2008 | Chapuis et al. | 713/340 |
| 2008/0072080 A1* | 3/2008 | Chapuis et al. | 713/300 |
| 2008/0074373 A1* | 3/2008 | Chapuis et al. | 345/89 |
| 2009/0167089 A1* | 7/2009 | Dishman et al. | 307/64 |

OTHER PUBLICATIONS

Unknown Author, "Integrated Single-Cell Lithium-Ion Battery—and Power-Management IC", "SLVS606A", Sep. 1, 2005, vol. TPS65800, Publisher: Texas Instruments, Published in: US.

Unknown Author, "8-Channel Power Supply Sequencer and Monitor With Error Logging", "SLVS813A", Jun. 1, 2008, vol. UCD9081, Publisher: Texas Instrument, Published in: US.

Unknown Author, "Voltage Monitoring and Sequencing", "Analog Devices Applications Bulletin", May 1, 2008, Publisher: www.analog.com, Published in: US.

PCT International Search Report and PCT Written Opinion of the International Searching Authority for PCT International Application No. PCT/US2010/038418, mailed on date Aug. 18, 2010.

Office Action dated Aug. 1, 2014, in corresponding Chinese Patent Application No. 201080026695.0.

* cited by examiner

SYSTEM AND METHOD FOR SEQUENTIALLY DISTRIBUTING POWER AMONG ONE OR MORE MODULES

FIELD OF THE INVENTION

This invention relates generally to system and method for sequentially distributing power among one or more modules, and in particular, to a programmable power distributing sequencer.

BACKGROUND OF THE INVENTION

The powering up of several modules in an electronic system may be a delicate process. In many cases, the modules should not be powered on at the same time because it may cause damage to one or more modules, improper or unintended operations, inefficient use of power, and other undesirable effects. Often instead, the powering on (as well as powering off) of modules requires a precise predetermined sequence. Generally, a power distributing sequencer is employed to perform this operation.

Typically, a power distributing sequencer controls a plurality of voltage regulators in order to supply voltages to various modules of an electronic system. Often, some of these regulators supply several voltages to an applications processor, and other modules depending on the configuration and function of the electronic system. For example, if the electronic system is a cellular telephone, the system may further include memory, audio circuitry, display, radio frequency (RF) chipset, digital signal processor, and others. The power distributing sequencer is typically hardwired to apply a predetermined power on sequence for a specific applications processor. Once the processor has been powered on, the processor provides discrete instructions to the sequencer on how and when to power up and down the respective modules of the system.

Because the power distributing sequencer is hardwired for a specific applications processor, if the system manufacturer decides to use another type of processor, then a new power distributing sequencer needs to be designed that will work properly with this type of processor. This has the adverse consequence of a long lead design and manufacturing cycle for the sequencer, which, in turn, delays the development and manufacturing of the electronic system. Furthermore, lots of interactions and time are spent between the sequencer manufacturer, processor manufacturer, and system manufacturer in order to properly design the sequencer so that it applies the appropriate power on and off sequences to the processor. This is generally a time consuming and expensive process. Moreover, if the system manufacturer has several products that uses different applications processors, the system manufacturer, as well as the sequencer manufacturer, have to manage and keep track of different types of sequencers, which complicates inventory.

SUMMARY OF THE INVENTION

An aspect of the invention relates to a programmable power distributing sequencer. The sequencer comprises a plurality of internal regulators, an internal memory adapted to store a user programmable script including instructions for enabling and disabling the regulators in a sequential manner, and a controller adapted to enable and disable the regulators based on the instructions of the user programmable script. The controller may receive the user programmable script from a programming source, such as an applications processor, an external memory, or external programming device.

In another aspect of the invention, the internal memory of the programmable power distributing sequencer further stores a default or benign script for sequentially enabling a plurality of regulators adapted to supply power to the programming source. According to this aspect, the controller, in response to an initial power on operation, accesses the default or benign script from the internal memory, and executes the script to safely and properly power up the programming source. Once the programming source has been successfully powered up, the controller receives the user programmable script from the programming source, stores the user programmable script in the internal memory, and executes the script to power up and power down one or more modules coupled to the sequencer, including re-powering up and powering down the programming source. After the initial power on, the controller uses the user programmable script to power up and power down the modules coupled to the sequencer, at least until the script is updated again.

In yet another aspect of the invention, the programmable power distributing sequencer includes an external regulator port that may be coupled to one or more external regulators. According to this aspect, the controller is adapted to sequentially enable and disable the one or more external regulators along with the internal regulators according to the instructions of the user programmable script. With the external regulator port, a plurality of power distributing sequencers may be coupled together in a cascaded, hierarchical, and/or redundant manner to expand the control of regulators beyond those in a single sequencer. In still another aspect of the invention, the programmable power distributing sequencer may include a fault detection module adapted to detect faulty operating regulators, and report that to the controller. The controller may take actions in response to one or more faulty regulators, including sending notification to an external device or performing a power down operation of one or more affected, as well as non-affected, modules.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1A:
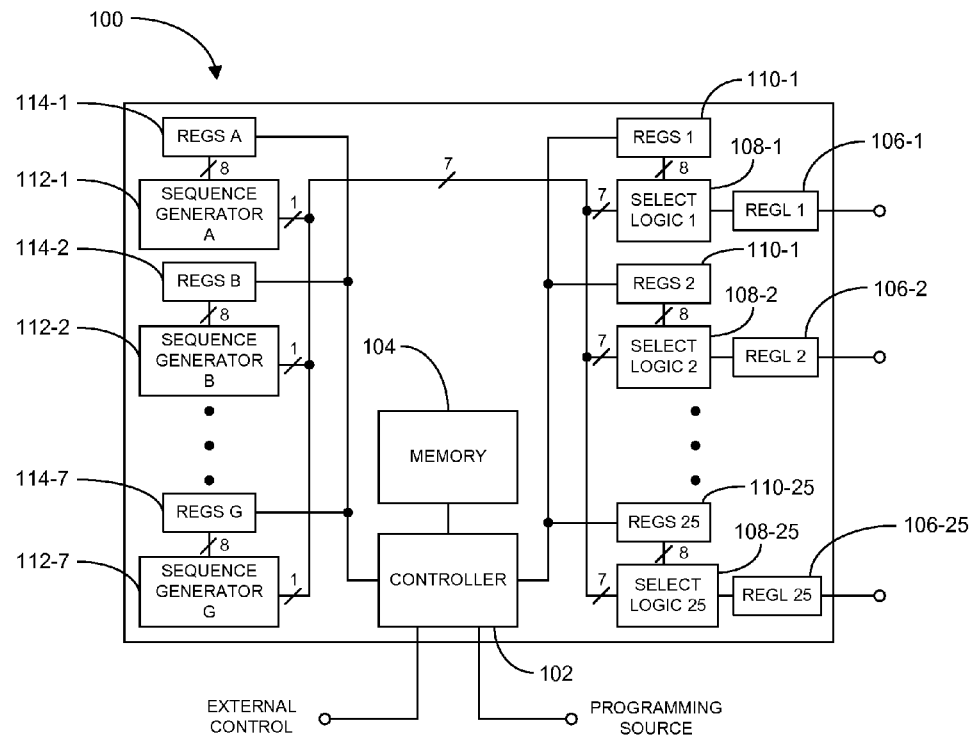
FIG. 1A illustrates a block diagram of an exemplary programmable power distributing sequencer in accordance with an embodiment of the invention.

FIG. 1A illustrates a block diagram of an exemplary programmable power distributing sequencer 100 in accordance with an embodiment of the invention. In summary, the sequencer 100 includes a default or benign power up sequence that is able to safely power up many types of applications processor. Once the applications processor is powered up, the sequencer 100 is able to receive a user programmable script from the applications processor which includes instructions on how sequentially power up and power down one or more modules connected to the sequencer. The user programmable script from the applications processor may even include instructions on how to sequentially re-power up the applications processor itself, which may be different than the default or benign power up sequence.

In particular, the programmable power distributing sequencer 100 comprises a controller 102, an internal memory 104, a plurality of sequence generators (A-G) 112-1 to 112-7, a first set of registers (A-G) 114-1 to 114-7, a plurality of regulators 106-1 to 106-25, a plurality of select logic devices (1-25) 108-1 to 108-25, and a second set of registers (1-25) 110-1 to 110-25. Although, in this example, there are seven (7) sequence generators, 25 regulators, and related circuitry (registers and select logic devices), it shall be understood that the sequencer 100 may include more or less of these components.

The sequence generators (A-G) 112-1 to 112-7 are respectively coupled to the registers (A-G) 114-1 to 114-7, which, in turn, specify how and when the generators are to generate a power up timing sequence and a power down timing sequence. In this exemplary embodiment, the power up timing sequence includes a plurality of periodic pulses (e.g., 16 pulses). Similarly, the power down timing sequence includes a plurality of substantially periodic pulses (e.g., 16 pulses). Information regarding the period for the sequence pulses is stored in the corresponding register. The corresponding register (114-1 to 114-7) also stores information as to whether the sequence generator should be initiated via a software command or an external control input.

The select logic devices (1-25) 108-1 to 108-25 enable and disable the respective regulators (1-25) 106-1 to 106-25 based on information stored in registers (1-25) 110-1 to 110-25, respectively. The corresponding register (110-1 to 110-25) specify the sequence generator to which the corresponding select logic device (108-1 to 108-25) is to select, the time slot of the power on timing sequence to enable the corresponding regulator (106-1 to 106-25), and the time slot of the power down timing sequence to disable the corresponding regulator (106-1 to 106-25).

Upon detecting an initial power on, the controller 102 reads a default or benign power on sequence instruction (e.g., a script) from the internal memory 104, and writes the corresponding information into one or more of the first set of registers (A-G) 114-1 to 114-7, and one or more of the second set of registers 110-1 to 110-25. An applications processor, serving as a subsequent programming source for the sequencer 100, is coupled to one or more of the regulators 106-1 to 106-25 of the sequencer. As an example, the default or benign power on sequence may be configured to safely power up an applications processor via the one or more regulators coupled to the processor. Once the applications processor is powered on, the controller receives a power up/down user programmable script from the applications processor, which instructs the sequencer 100 on how to sequentially power up and power down one or more modules coupled to the regulators of the sequencer 100.

The one or more modules being powered up and down may include the applications processor. Thus, the applications processor may send a script to the sequencer 100 to cause the sequencer to re-power up the applications processor. The re-powering up sequence of the applications processor may configure the processor for improved performance over that of which the default or benign sequence initially configures the processor. Although it may not configure the corresponding applications processor to its optimized performance, the default or benign sequence allows the sequencer to be used with many type of applications processor. This has the advantages of improving the development of electronic systems using the sequencer; reduces product defining interactions between the designer of the sequencer, designer of the applications processor, and designer of the electronic system; and simplifies inventory for both manufacturers of the sequencer and electronic system, since only a single type sequencer needs to be tracked.

Figure 1B:
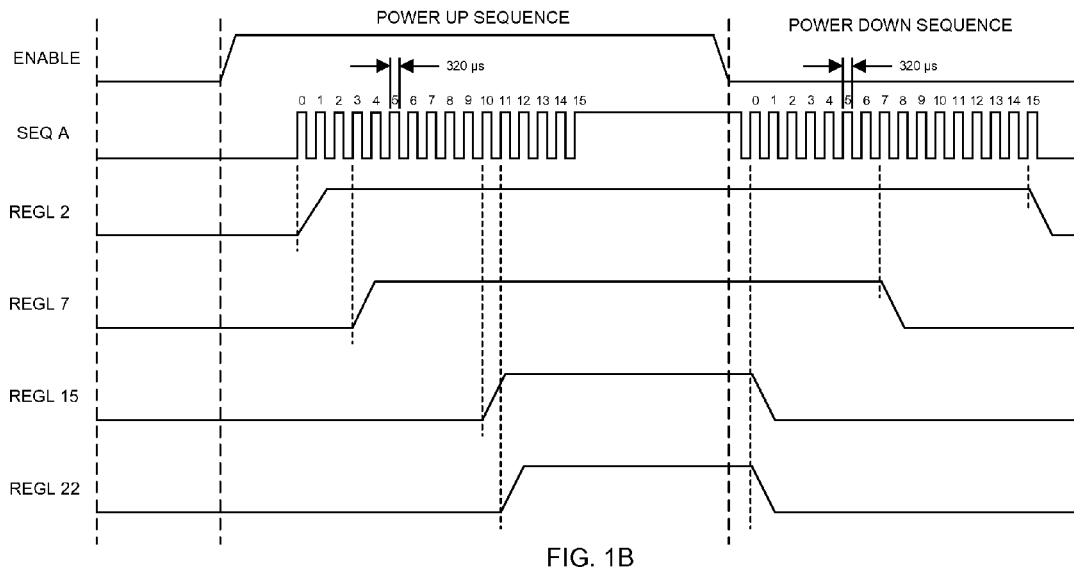
FIG. 1B illustrates a timing diagram of exemplary signals generated in the programmable power distributing sequencer in accordance with another embodiment of the invention.

FIG. 1B illustrates a timing diagram of exemplary signals generated in the programmable power distributing sequencer 100 in accordance with another embodiment of the invention. In this example, the sequencer 100 has been programmed to assign the power up/down timing sequences generated by sequence generator (A) 112-1 to regulators (2, 7, 15, and 22) 106-2, 106-7, 106-15, and 106-22; thereby forming a group whose power up/down timing relationship is governed by the sequences generated by sequence generator (A) 112-1. The power up/down timing sequences generated by sequence generator (A) 112-1 has been configured to generate 16 pulses (e.g., pulses 0-15) for the power up sequence and another 16 pulses (e.g., 0-15) for the power down sequence. Additionally, the sequence generator (A) 112-1 has been configured to generate the pulses of the power up and power down sequences in a substantially periodic manner, with a period, for example, of approximately 320 µs (microseconds). It shall be understood that the sequences need not be periodic pulses, need not have 16 pulses each, and need not have a period of 320 µs.

Regulator (2) 106-2, in turn, has been configured to be powered up at substantially time slot (pulse) zero (0) of the power up sequence, and powered down at substantially time slot (pulse) 15 of the power down sequence. Regulator (7)

106-7, in turn, has been configured to be powered up at substantially time slot three (3) of the power up sequence, and powered down at substantially time slot seven (7) of the power down sequence. Regulator (15) 106-15, in turn, has been configured to be powered up at substantially time slot 10 of the power up sequence, and powered down at substantially time slot zero (0) of the power down sequence. Finally, Regulator (22) 106-22, in turn, has been configured to be powered up at substantially time slot 11 of the power up sequence, and powered down at substantially time slot zero (0) of the power down sequence.

In this example, the regulators (2, 7, 15, and 22) 106-2, 106-7, 106-15, and 106-22 may be coupled respectively to power inputs of a particular electronic module. The electronic module may require the power up and power down sequences as shown in order to properly and safely turn on, and properly and safely turn off. The enable signal, which may be provided by a software command issued by the controller 102 or may be issued externally via the external control, initiates the power up sequence when it changes from a low logic state to a high logic state, and initiates the power down sequence when it changes from the high logic state to the low logic state. As previously discussed, the other sequence generators may be configured with different periods, and the regulators coupled respectively to them may be configured to turn on and off at the programmed time slots.

An advantage of the sequencer 100 is that a control signal line, such as SEQ A as described above, may be used to commonly control a group of regulators, such as regulators 106-2, 106-7, 106-15, and 106-22. The timing or clocking information for controlling the regulator group is embedded in the control signal line. Another advantage of the sequencer 100 is that a regulator assigned to a group can immediately assume the correct on or off state, with effectively no delay, due to the use of pulse detectors embedded in the select logics 108-1 to 108-25, respectively.

Additionally, the sequencer 100 may be configured to reduce the pulse detection time by the select logic. For example, the sequence generated by sequencer generator A 112-1 may be configured with a relatively high frequency to reduce the period of each pulse. This increments the counters in the select logic and trigger power-up and power-down operations. The higher frequency reduces the pulse detector time constant to a small, substantially fixed period, saving area. The shorted detection time allows a regulator to quickly transition on or off when programmed to a new group that is not in transition.

Figure 2A:
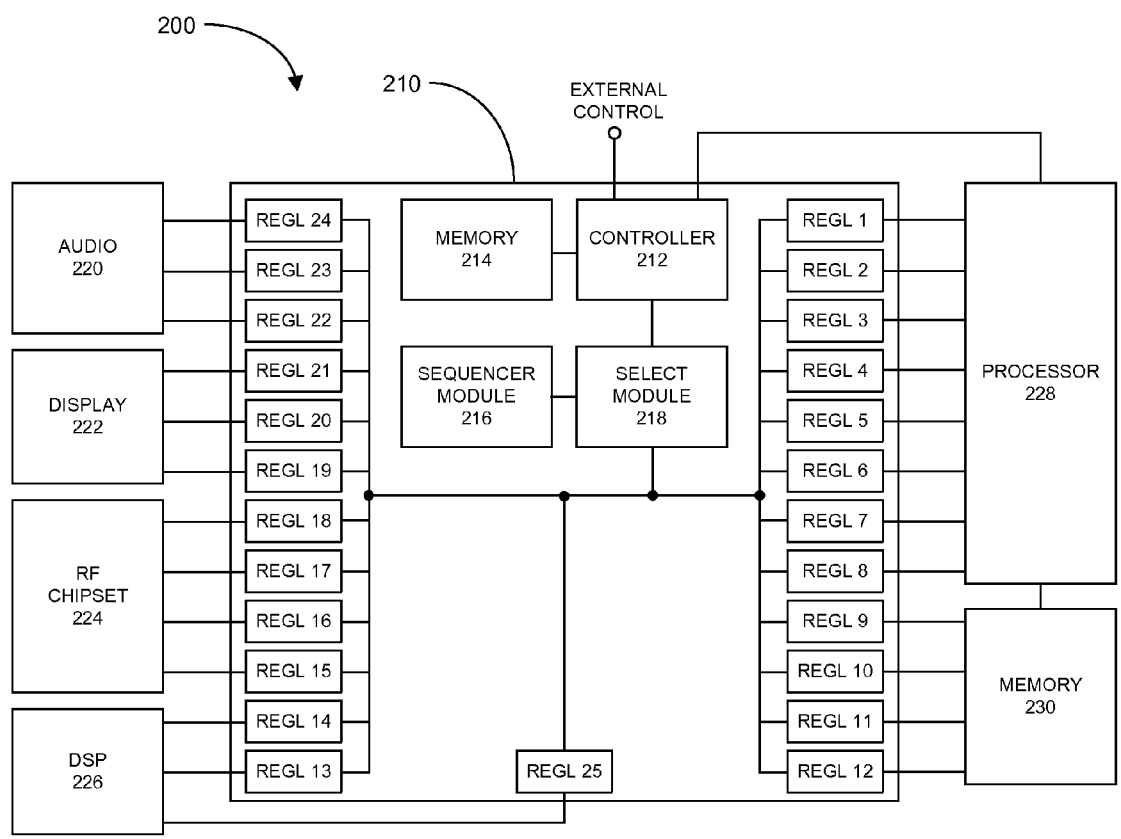
FIG. 2A illustrates a block diagram of another exemplary programmable power distributing sequencer coupled to several exemplary modules in accordance with another embodiment of the invention.

FIG. 2A illustrates a block diagram of an exemplary electronic system 200 including an exemplary programmable power distributing sequencer 210 coupled to various modules in accordance with another embodiment of the invention. In this example, the electronic system 200 may be a cellular telephone or other device. The electronic system 200 comprises the programmable power distributing sequencer 210, an applications processor 228, an external memory 230, an audio module 220, a display 222, a radio frequency (RF) chipset 224, and a digital signal processor (DSP) 226. The programmable power distributing sequencer 210, in turn, comprises a controller 212, an internal memory 214, a sequencer module 216, a select module 218, and 25 regulators 1-25.

In this example, regulators 1-8 are configured to provide power to the applications processor 228. Regulators 9-12 are configured to provide power to the external memory 230. Regulators 22-24 are configured to provide power to the audio module 220. Regulators 19-21 are configured to provide power to the display 222. Regulators 15-18 are configured to provide power to the RF chipset 224. And, regulators 13-14 and 25 are configured to provide power to the DSP 226. The sequencer module 216 generates the various power up/down timing sequences for the various modules. As an example, the sequencer module 216 may generate a power up/down sequence for regulators 1-8 to properly power up/down the applications processor 228. The sequencer module 216 may generate another power up/down sequence for regulators 9-12 to properly power up/down the memory 230. The sequencer module 216 may also generate corresponding sequences for the remaining modules. It shall be understood that a particular sequence generated by the sequence module 216 may be applied to regulators coupled to different modules. Additionally, a particular module may be coupled to regulators driven by different sequences generated by the sequence module 216.

The select module 218 generates an enable and disable signal for the regulators 1-25 based on the sequences generated by the sequencer module 216 and the power up/down instructions provided by the controller 212. The internal memory 214, which may be configured as a non-volatile memory, stores a default or benign power up script that instructs the controller 212 to control the select module 218 in a manner that enables one or more of regulators 1-8 in a particular sequence in order to safely and properly power up the applications processor 228. Additionally, after a successful power up of the applications processor 228, the internal memory 214 may be updated with a user programmable script that provides instructions on how to sequentially power up and down the various modules (applications processor 228, memory 230, audio 220, display 222, RF chipset 224 and DSP 226) of the electronic system 200. The following describes an exemplary operation performed by the programmable power distributing sequencer 210.

Figure 2B:
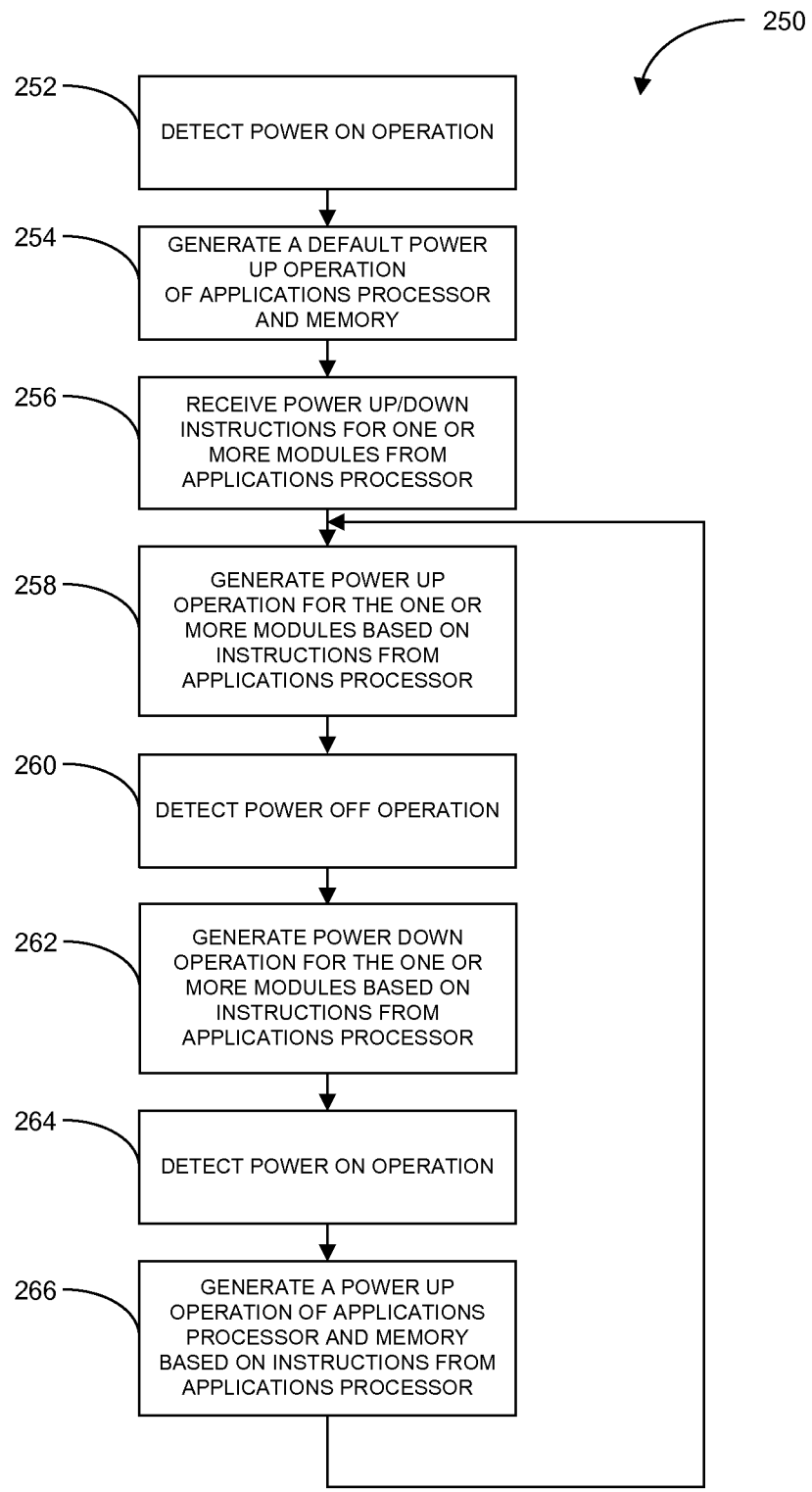
FIG. 2B illustrates a flow diagram of an exemplary method of sequentially distributing power in accordance with another embodiment of the invention.

FIG. 2B illustrates a flow diagram of an exemplary method 250 of sequentially distributing power in accordance with another embodiment of the invention. According to the method 250, the controller 212 of the programmable power distributing sequencer 210 detects an initial power on operation of the electronic system 200 (e.g., such as when a user initially turns on the system) (block 252). In response to detecting the power on operation, the controller 212 executes a default power up script stored in the internal memory 214 to cause the applications processor 228 and external memory 230 to safely and properly turn on (block 254). This may require the controller 212 to enable one or more of the regulators 1-8 coupled to the applications processor 228, and one or more of the regulators 9-12 coupled to the external memory 230.

After the applications processor 228 and memory 230 have successfully turned on, the applications processor 228 reads a power up/down user programmable script for one or more modules of the electronic system 200 from the memory 230, and sends the script to the internal memory 214 via the controller 212 (block 256). The controller 212 then executes the power up portion of the script to generate a power up operation for one or more modules based on the instructions provided in the script (block 258). As previously discussed, the one or more modules may include the audio module 220, the display 222, the RF chipset 224, and the DSP 226.

Subsequently, after the successful power up operation of the various modules of the electronic system 200, the controller 212 detects a power down operation of the electronic system 200 (e.g., such as when a user turns off the system) (block 260). In response to detecting the power off operation, the controller 212 executes the power down portion of the new script stored in the internal memory 214 to cause the one or more modules of the electronic system 200 to turn off according to the instructions provided by the script (block 262). Subsequently, the controller 212 detects another power on operation of the electronic system 200 (e.g., such as when a user turns on the system again) (block 264). In this case, the controller 212 need not execute the default or benign script, because the new script has already been stored in the non-volatile internal memory 214. Thus, the controller 212 reads and executes the new script to generate a power on operation of the applications processor 228 and memory 230 (block 266), and one or more modules based on the instructions of the script (block 258). It shall be understood that the applications processor 228 may on occasion update the power up/down user programmable script stored in the internal memory 214.

Figure 3A:
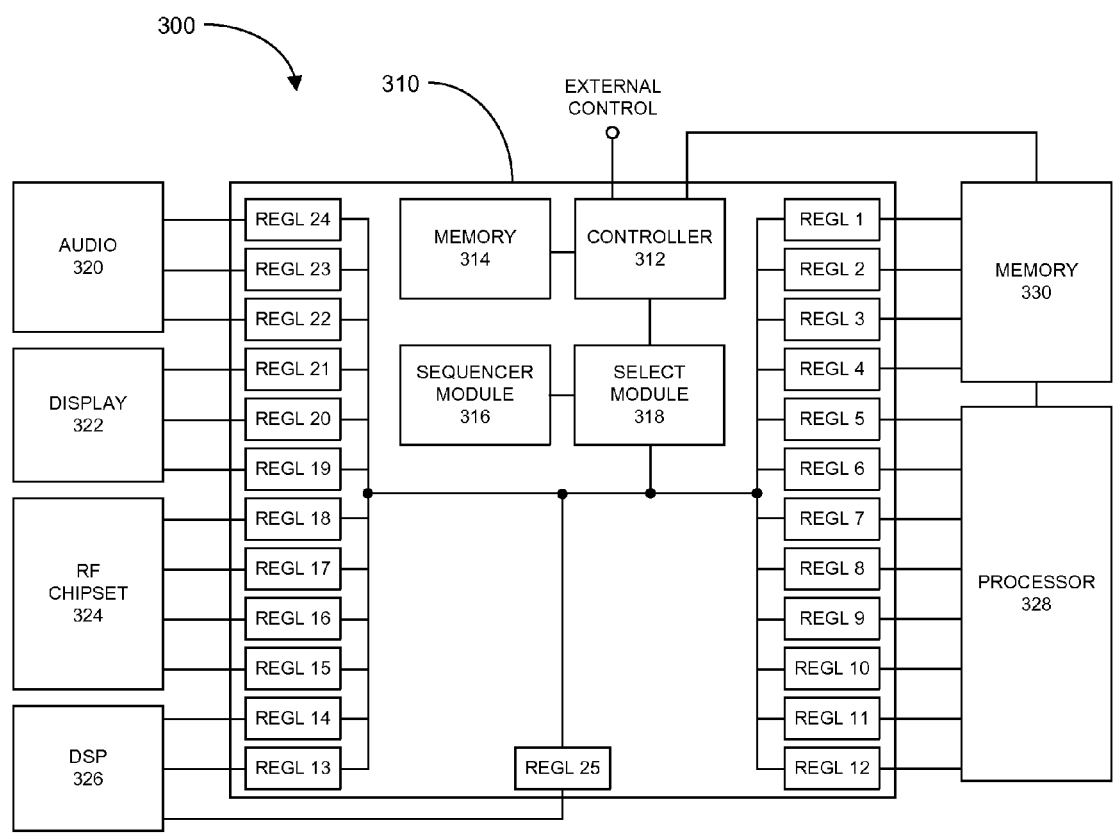
FIG. 3A illustrates a block diagram of another exemplary programmable power distributing sequencer coupled to several exemplary modules in accordance with another embodiment of the invention.

FIG. 3A illustrates a block diagram of another exemplary electronic system 300 including an exemplary programmable power distributing sequencer 310 coupled to various modules in accordance with another embodiment of the invention. Similar to the previous embodiment 200, the electronic system 300 may be a cellular telephone or other device. The electronic system 300 comprises the programmable power distributing sequencer 310, an applications processor 328, an external memory 330, an audio module 320, a display 322, an RF chipset 224, and a DSP 326. The programmable power distributing sequencer 310, in turn, comprises a controller 312, an internal memory 314, a sequencer module 316, a select module 318, and 25 regulators 1-25. Regulators 1-4, 5-12, 22-24, 19-21, 15-18, and 13-14 and 25 are configured to provide power to the external memory 330, applications processor 328, audio module 320, display 322, RF chipset 324, and DSP 326, respectively.

The programmable power distributing sequencer 310 differs from the previous embodiment 210 in that sequencer 310 is able to read the new power up/down user programmable script directly from the external memory 330, instead of receiving it from the applications processor 328. As shown, the controller 312 is directly coupled to the memory 330 in order to read the power up/down user programmable script from the memory 330. The following describes an exemplary operation performed by the programmable power distributing sequencer 310.

Figure 3B:
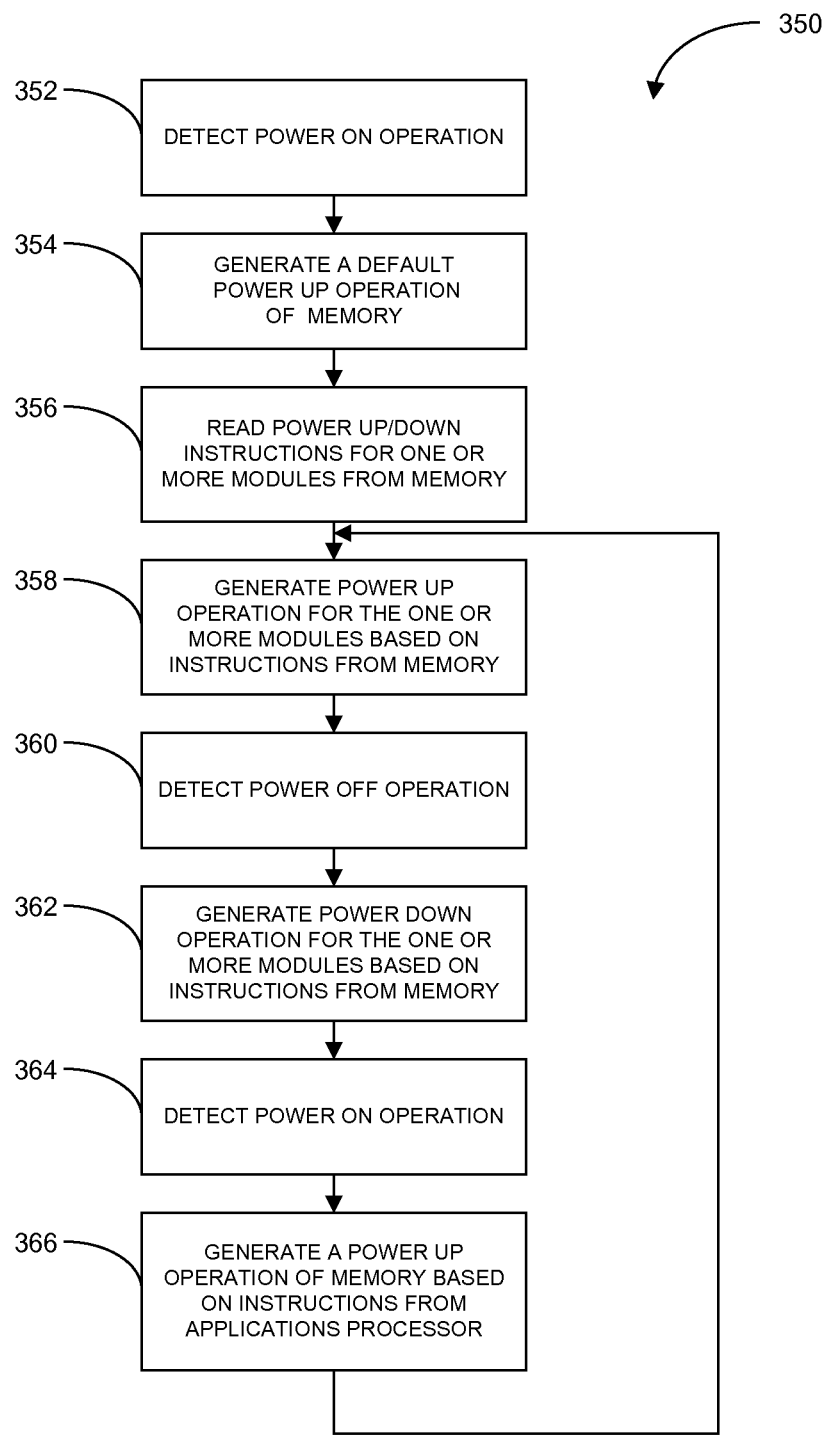
FIG. 3B illustrates a flow diagram of another exemplary method of sequentially distributing power in accordance with another embodiment of the invention.

FIG. 3B illustrates a flow diagram of an exemplary method 350 of sequentially distributing power in accordance with another embodiment of the invention. According to the method 350, the controller 312 of the programmable power distributing sequencer 310 detects an initial power on operation of the electronic system 300 (e.g., such as when a user initially turns on the system) (block 352). In response to detecting the power on operation, the controller 312 executes a default power up script stored in the internal memory 314 to cause the external memory 330 to safely and properly turn on (block 354). This may require the controller 312 to enable one or more of the regulators 1-4 coupled to the external memory 330.

After the external memory 330 has successfully turned on, the controller 312 reads a power up/down user programmable script for one or more modules of the electronic system 300 from the external memory 330, and stores the script in the internal memory 314 (block 356). The controller 312 then executes the power up portion of the script to generate a power up operation for one or more modules based on the instructions provided in the script (block 358). As previously discussed, the one or more modules may include the applications processor 328, the audio module 320, the display 322, the RF chipset 324, and the DSP 326.

Subsequently, after the successful power up operation of the various modules of the electronic system 300, the controller 312 detects a power down operation of the electronic system 300 (e.g., such as when a user turns off the system) (block 360). In response to detecting the power off operation, the controller 312 executes the power down portion of the new script stored in the internal memory 314 to cause the one or more modules of the electronic system 300 to turn off according to the instructions provided by the script (block 362). Subsequently, the controller 312 detects another power on operation of the electronic system 300 (e.g., such as when a user turns on the system again) (block 364). In this case, the controller 312 need not execute the default or benign script, because the new script has already been stored in the non-volatile internal memory 314. Thus, the controller 312 reads and executes the new script to generate a power on operation of the memory 330 (block 366), and one or more modules based on the instructions of the script (block 358). It shall be understood that the controller 312 may on occasion access the external memory 330 to receive updates to the power up/down user programmable script.

Figure 4A:
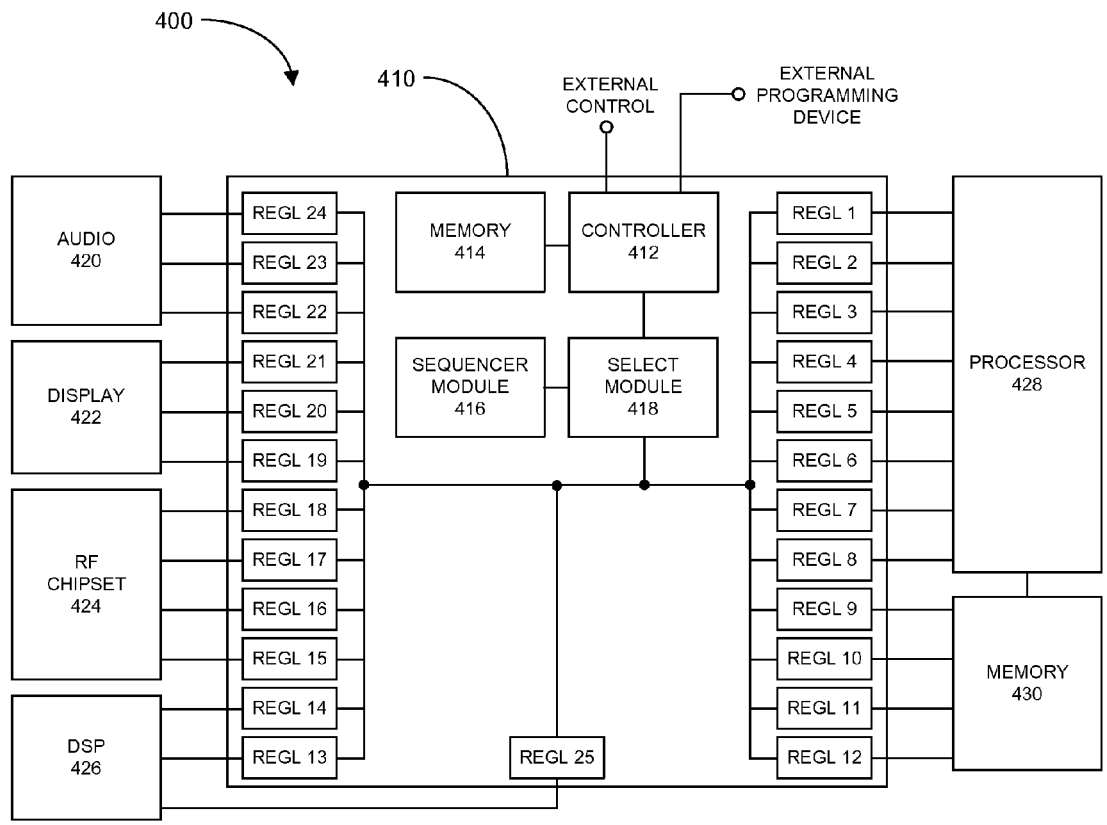
FIG. 4A illustrates a block diagram of another exemplary programmable power distributing sequencer coupled to several exemplary modules in accordance with another embodiment of the invention.

FIG. 4A illustrates a block diagram of another exemplary electronic system 400 including an exemplary programmable power distributing sequencer 410 coupled to various modules in accordance with another embodiment of the invention. Similar to the previous embodiments 200 and 300, the electronic system 400 may be a cellular telephone or other device. The electronic system 400 comprises the programmable power distributing sequencer 410, an applications processor 428, an external memory 430, an audio module 420, a display 422, an RF chipset 424, and a DSP 426. The programmable power distributing sequencer 410, in turn, comprises a controller 412, an internal memory 414, a sequencer module 416, a select module 418, and 25 regulators 1-25. Regulators 1-8, 9-12, 22-24, 19-21, 15-18, and 13-14 and 25 are configured to provide power to the applications processor 428, the external memory 430, the audio module 420, the display 422, the RF chipset 424, and the DSP 426, respectively.

The programmable power distributing sequencer 410 differs from the previous embodiments 210 and 310 in that sequencer 410 is able to receive the new power up/down user programmable script from an external programming device, instead of the applications processor 428 or the external memory 430. As shown, the controller 412 is coupled to an external programming device for receiving the power up/down user programmable script. The external programming device could be any type of device that is able to communicate a power up/down script to the sequencer 410, such as an external computer. The following describes an exemplary operation performed by the programmable power distributing sequencer 410.

Figure 4B:
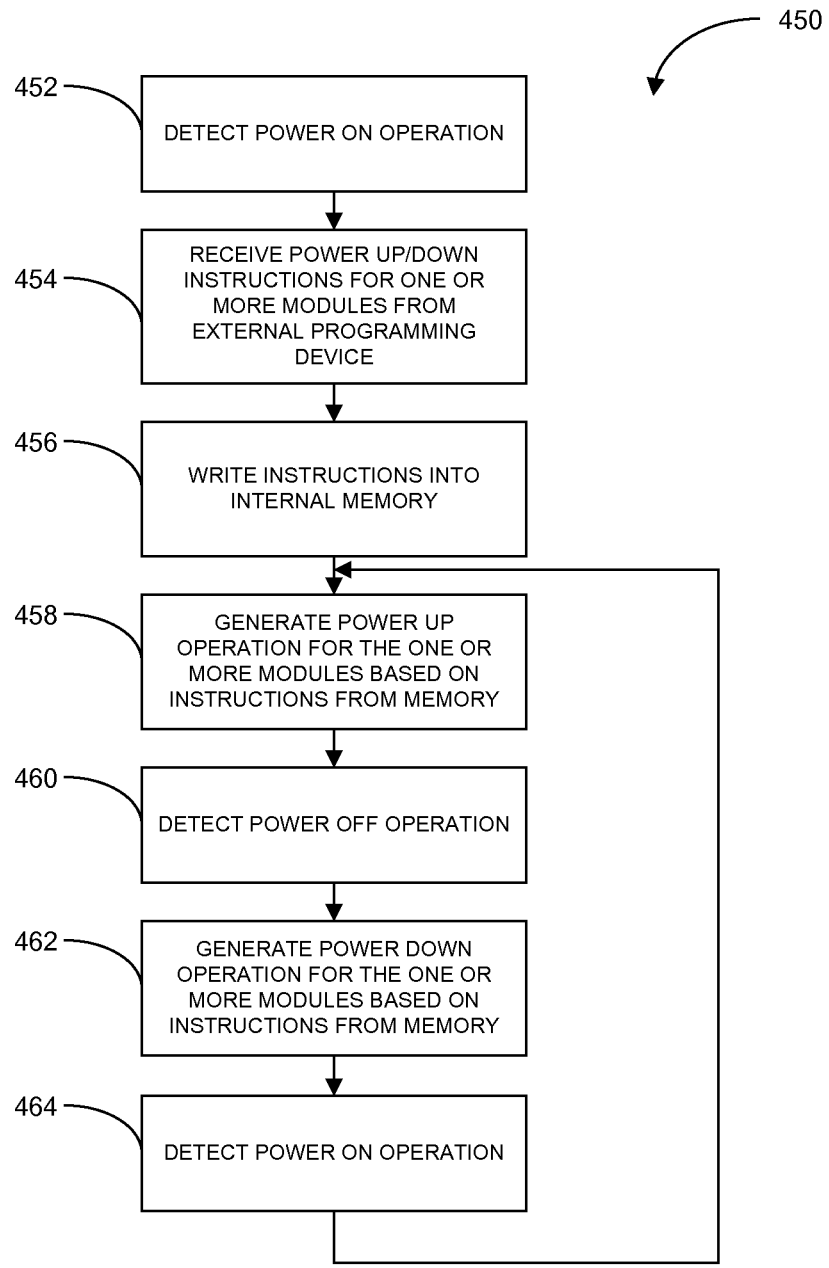
FIG. 4B illustrates a flow diagram of another exemplary method of sequentially distributing power in accordance with another embodiment of the invention.

FIG. 4B illustrates a flow diagram of another exemplary method 450 of sequentially distributing power in accordance with another embodiment of the invention. According to the method 450, the controller 412 of the programmable power distributing sequencer 410 detects an initial power on operation of the electronic system 400 (e.g., such as when a user initially turns on the system) (block 452). In response to detecting the power on operation, the controller 412 receives a power up/down user programmable script for one or more modules of the electronic system 400 from the external programming device (block 454), and stores the script to the internal memory 414 (block 456). The controller 412 then executes the power up portion of the script to generate a power up operation for one or more modules based on the instructions provided in the script (block 458). As previously discussed, the one or more modules may include the applications processor 428, the memory 430, the audio module 420, the display 422, the RF chipset 424, and the DSP 426.

Subsequently, after the successful power up operation of the various modules of the electronic system 400, the controller 412 detects a power down operation of the electronic system 400 (e.g., such as when a user turns off the system) (block 460). In response to detecting the power off operation, the controller 412 executes the power down portion of the new script stored in the internal memory 414 to cause the one or more modules of the electronic system 400 to turn off according to the instructions provided by the script (block 462). Subsequently, the controller 412 detects another power on operation of the electronic system 400 (e.g., such as when a user turns on the system again) (block 464). In this case, the controller 412 need not receive the script from the external programming device since it has already stored it in the non-volatile internal memory 414. Thus, the controller 412 reads and executes the new script to generate a power on operation of one or more modules based on the instructions of the script (block 458). It shall be understood that the controller 412 may on occasion receive updates to the user programmable script from the external programming device.

Figure 5:
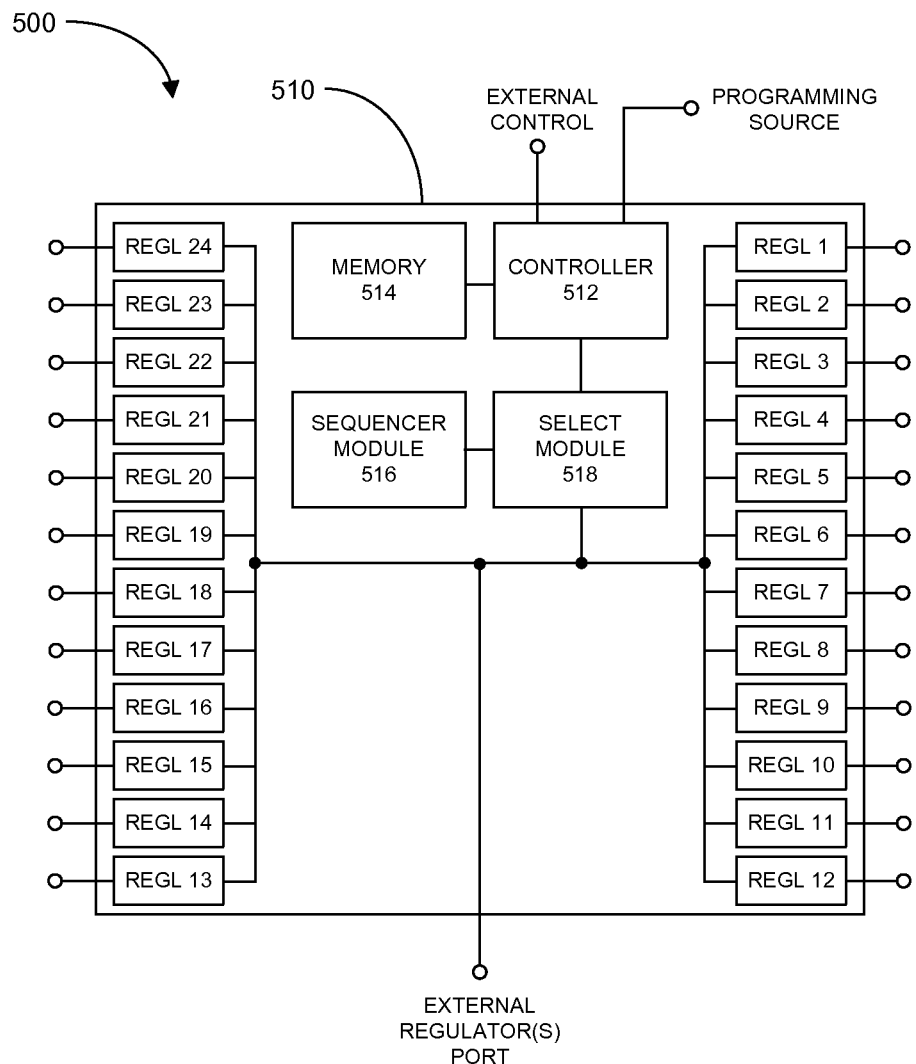
FIG. 5 illustrates a block diagram of another exemplary programmable power distributing sequencer in accordance with another embodiment of the invention.

FIG. 5 illustrates a block diagram of an exemplary programmable power distributing sequencer 500 in accordance with another embodiment of the invention. The programmable power distributing sequencer 500 is similar to the previous embodiments 210, 310, and 410, and includes a controller 512, an internal memory 514, a sequencer module 516, a select module 518, and a plurality of internal registers 1-24. Additionally, the programmable power distributing sequencer 500 further includes an external regulator port for coupling to one or more external regulators. With the external regulator port, the programmable power distributing sequencer 500 may control external regulators in a similar manner as it controls the internal regulators 1-24. For example, using the power up/down user programmable script stored in internal memory 514, the controller 512 is able to enable and disable any external registers coupled to the external register port based on instructions provided in the script. This has the benefit of expanding the functionality of the programmable power distributing sequencer 500 by allowing the addition of external regulators subject to the control of the sequencer.

Figure 6:
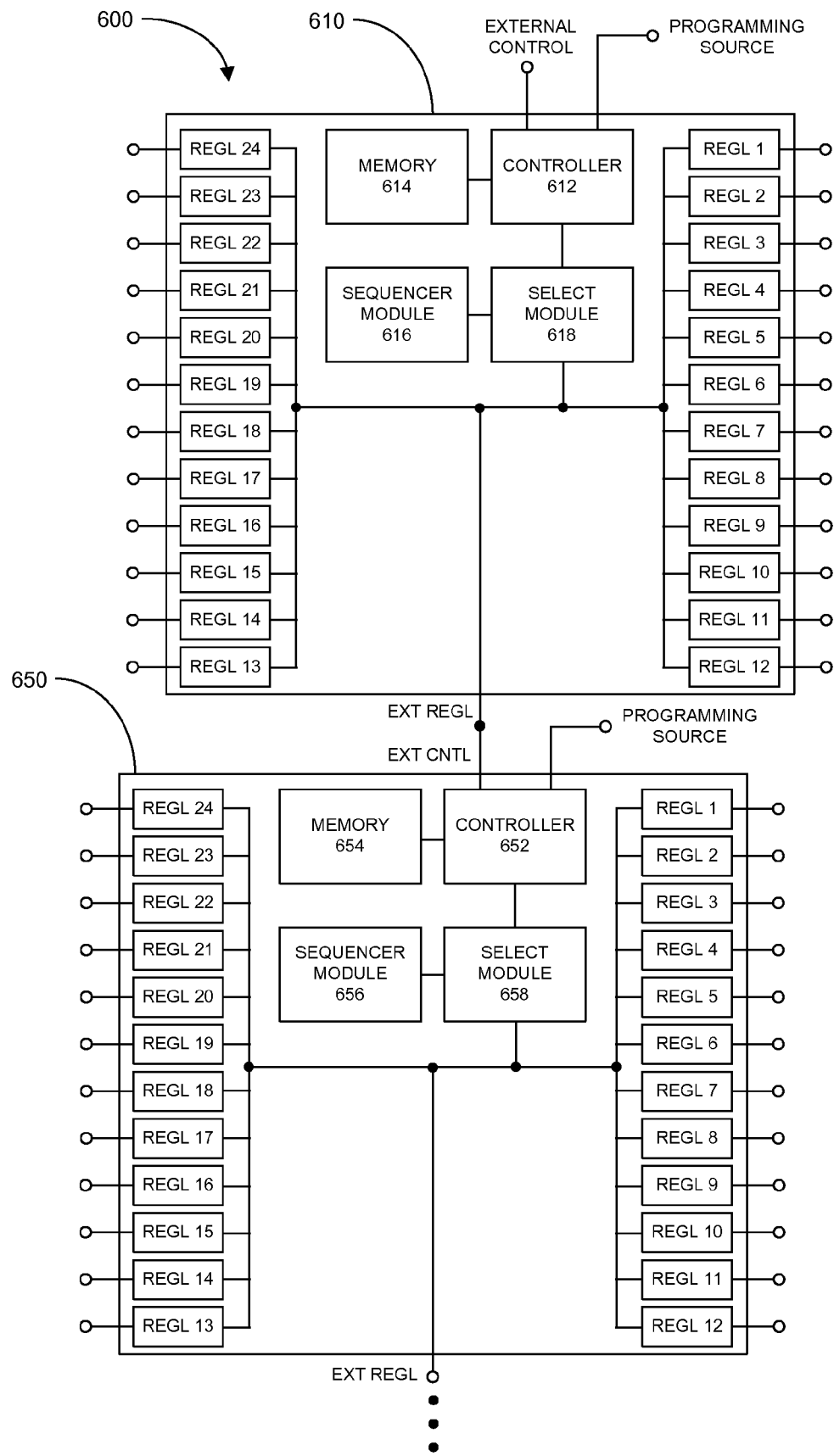
FIG. 6 illustrates a block diagram of a pair of exemplary programmable power distributing sequencers in a master-slave configuration in accordance with another embodiment of the invention.

FIG. 6 illustrates a block diagram of an exemplary system 600 including a pair of exemplary programmable power distributing sequencers 610 and 650 in a master-slave configuration in accordance with another embodiment of the invention. The programmable power distributing sequencers 600 and 650 are similar to the previous embodiment 500, and respectively include controllers 612 and 652, internal memories 614 and 654, sequencer modules 616 and 656, select modules 618 and 658, and a plurality of internal registers 1-24 each. Additionally, in this example, the programmable power distributing sequencer 600 further includes an external regulator port coupled to an external control of the programmable power distributing sequencer 650. In this configuration, the "master" programmable power distributing sequencer 600, using a master script stored in internal memory 614, may send a control signal (via the external regulator port and external control port) to the "slave" programmable power distributing sequencer 650 to initiate the slave's power up/down operation dictated by the "slave" script stored in internal memory 654. This has the benefit of forming cascaded, hierarchical, or redundant configuration of sequencers, thereby substantially expanding the functionality and improving reliability of the power sequencing operation.

Figure 7:
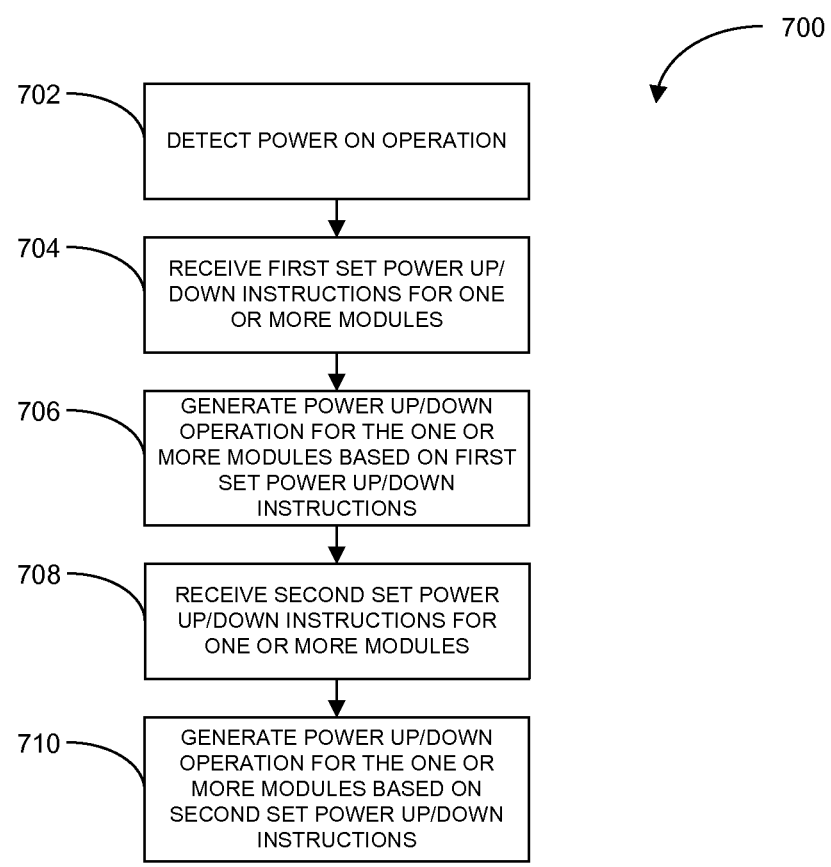
FIG. 7 illustrates a flow diagram of another exemplary method of sequentially distributing power in accordance with another embodiment of the invention.

FIG. 7 illustrates a flow diagram of another exemplary method 700 of sequentially distributing power in accordance with another embodiment of the invention. As discussed, in any of the previous embodiments, the power up/down user programmable script stored in the internal memory may be updated as required. The exemplary method 700 merely underscores this feature of the embodiments described herein. According to the method 700, the corresponding controller detects a power on operation (block 702). Subsequently, the corresponding controller receives a first set of power/up down instructions (e.g., a first user programmable script) from a programming source (e.g., applications processor, external memory, external programming device, etc.) (block 704). The corresponding controller then generates a power up/down operation for one or more modules based on the first set of power up/down instructions (block 706).

Then, subsequently, the corresponding controller receives a second set of power/up down instructions (e.g., a second user programmable script) from a programming source (e.g., applications processor, external memory, external programming device, etc.) (block 708). The corresponding controller then generates a power up/down operation for one or more modules based on the second set of power up/down instructions (block 710). This process of updating the power up/down script may continue as needed by changes in the system and/or its operations. This provides much flexibility to designers using the programmable power distributing sequencer, and facilitates designing, manufacturing, and inventory control, as previously discussed.

Figure 8A:
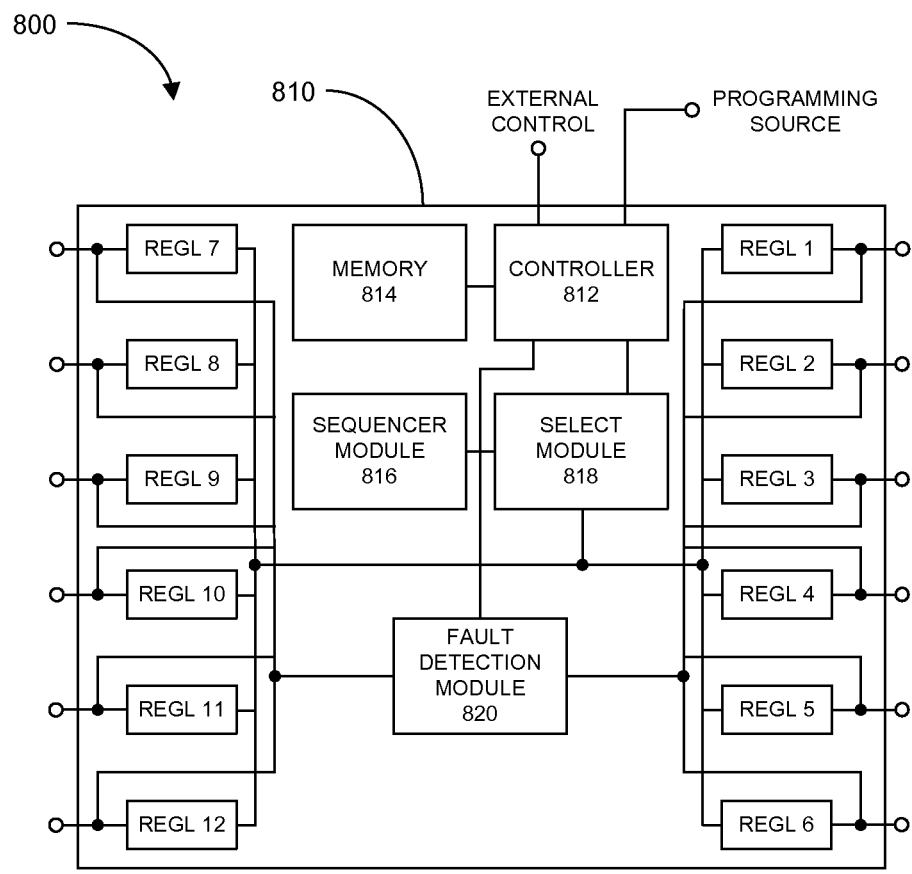
FIG. 8A illustrates a block diagram of another exemplary programmable power distributing sequencer in accordance with another embodiment of the invention.

FIG. 8A illustrates a block diagram of another exemplary programmable power distributing sequencer 800 in accordance with another embodiment of the invention. The programmable power distributing sequencer 800 is similar to the previous embodiments 210, 310, 410, and 500, and includes a controller 812, an internal memory 814, a sequencer module 816, a select module 818, and a plurality of registers 1-12.

Additionally, the programmable power distributing sequencer 800 further includes a fault detection module 820 adapted to detect faulty operation in one or more of the regulators 1-12. In particular, the outputs of the regulators 1-12 are coupled to the fault detection module 820. The fault detection module 820, in turn, is coupled to the controller 812. In response to detecting one or more faults respectively among the one or more regulators 1-12, the fault detection module 820 informs the controller 812 of the identity of the one or more faulty regulators 1-12. In response, the controller 812 may take appropriate action based on the one or more faulty regulators. These actions may include sending a notification of the one or more faulty regulators to the applications processor or other device, and/or perform a power down operation to power down one or more modules affected by faulty one or more regulators, as well as other non-affected one or more modules. The following describes an exemplary operation of the programmable power distributing sequencer 800.

Figure 8B:
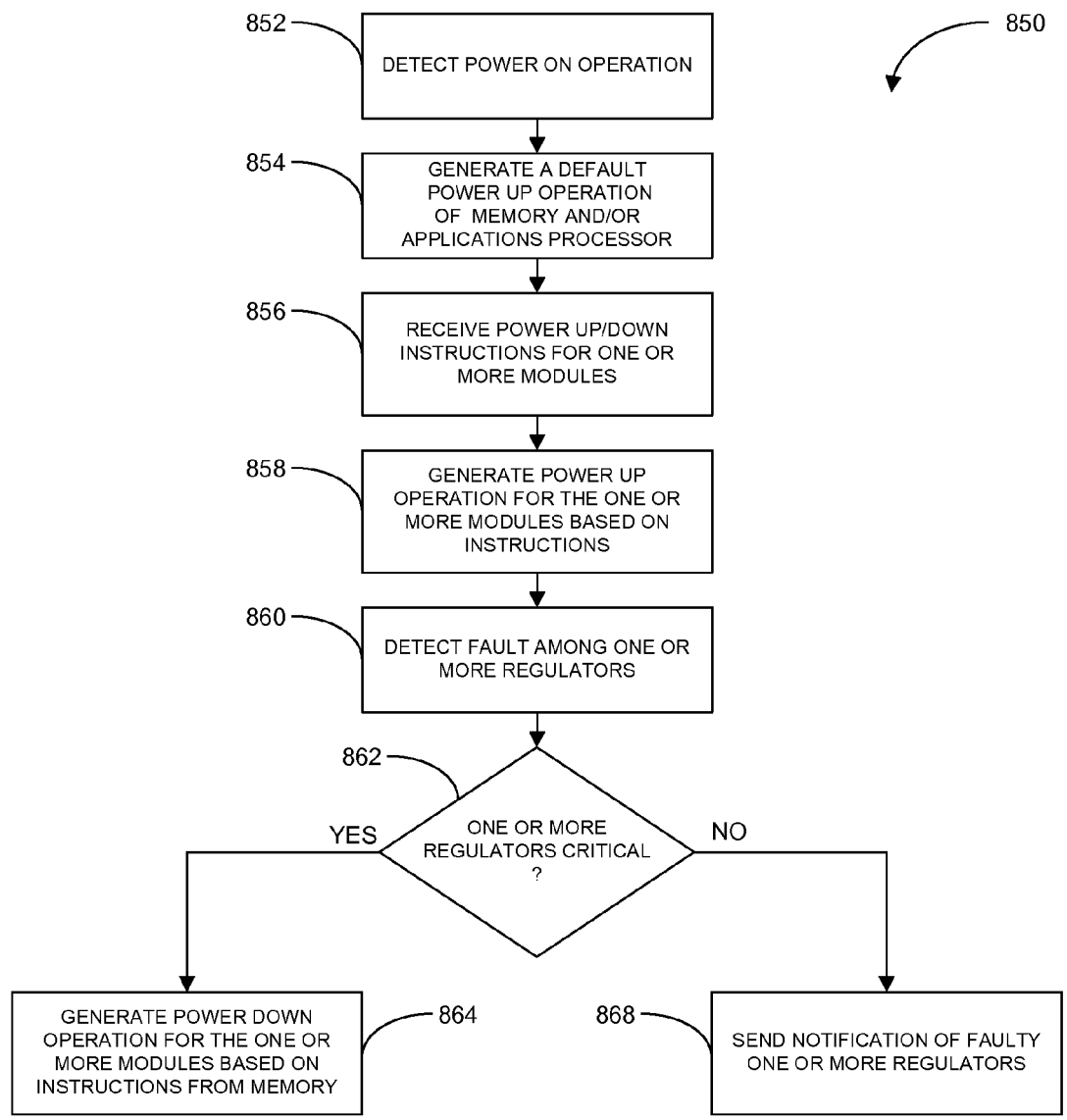
FIG. 8B illustrates a flow diagram of an exemplary method of detecting and responding to one or more faulty regulators in accordance with another embodiment of the invention.

FIG. 8B illustrates a flow diagram of an exemplary method 850 of detecting and responding to one or more faulty regulators in accordance with another embodiment of the invention. According to the method 850, the controller 812 detects a power on operation of the corresponding electronic system (block 852). In response to detecting the power on operation, the controller 812 may execute a default or benign power up operation stored in the internal memory 814 to power up the applications processor and/or external memory (block 854). Subsequently, the controller 812 receives a power up/down user programmable script for one or more modules from a programming source (e.g., an applications processor, external memory, external programming device, etc.), and stores the script in the internal memory 814 (block 856). The controller 812 then executes the script to power up one or more modules based on the instructions provided by the script (block 858).

While the programmable power distributing sequencer 800 is operational, the fault detection module 820 monitors the regulators 1-12 for faulty operation. If the fault detection module 820 detects faulty operation among the one or more of the regulators, the fault detection module 820 communicates the identity of the one or more faulty regulators to the controller 812 (block 860). In response, the controller 812 determines whether the one or more faulty regulators provides power to one or more critical modules (block 862). If it does, the controller 812 generates a power down operation to power down the one or more critical modules (and possibly other one or more unaffected modules) (block 864). Otherwise, the controller 812 may send a notification of the one or more faulty regulators to the applications processor or other device, which, in turn, may take some responsive action.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A programmable power distributing sequencer, comprising:
    a plurality of regulators;
    a first memory adapted to store a first user programmable script including instructions for enabling and disabling the regulators in a sequential manner;
    a sequencer module coupled to the first memory, the sequencer module that generates a plurality of predetermined start-up timing sequences based on instructions of the first user programmable script;
    a select module adapted to generate enable and disable signals respectively for the regulators based on the plurality of predetermined start-up timing sequences; and
    a feedback loop that couples information to the sequencer module that updates the plurality of predetermined start-up timing sequences based at least in part on information related to at least one of the plurality of regulators.

2. The programmable power distributing sequencer of claim 1, further comprising a controller adapted to:
    receive the first user programmable script from an applications processor; and
    store the first user programmable script in the first memory.

3. The programmable power distributing sequencer of claim 2, wherein the first memory is further adapted to store a default script including instructions for sequentially enabling regulators coupled to the applications processor, and wherein the controller is further adapted to enable the regulators coupled to the applications processor based on the instructions of the default script.

4. The programmable power distributing sequencer of claim 3, wherein the controller is adapted to enable the regulators coupled to the applications processor based on the default script prior to receiving the first user programmable script from the applications processor.

5. The programmable power distributing sequencer of claim 4, wherein the controller is adapted to enable the regulators coupled to the applications processor based on the first user programmable script.

6. The programmable power distributing sequencer of claim 3, wherein the controller is adapted to enable the regulators coupled to the applications processor based on the default script in response to detecting an initial power on operation.

7. The programmable power distributing sequencer of claim 1, further comprising a controller adapted to:
    receive the first user programmable script from a second memory; and
    store the first user programmable script in the first memory.

8. The programmable power distributing sequencer of claim 7, wherein the first memory is further adapted to store a default script including instructions for enabling one or more regulators coupled to the second memory, and wherein the controller is further adapted to enable one or more regulators coupled to the second memory based on the instructions of the default script.

9. The programmable power distributing sequencer of claim 8, wherein the controller is adapted to enable the one or more regulators coupled to the second memory based on the default script prior to receiving the first user programmable script from the second memory.

10. The programmable power distributing sequencer of claim 9, wherein the controller is adapted to enable the one or more coupled to the second memory based on the first user programmable script.

11. The programmable power distributing sequencer of claim 8, wherein the controller is adapted to enable the one or more regulators coupled to the second memory based on the default script in response to detecting an initial power on operation.

12. The programmable power distributing sequencer of claim 1, further comprising a controller is adapted to:
    receive the first user programmable script from an external programming device; and
    store the first user programmable script in the first memory.

13. The programmable power distributing sequencer of claim 1, further comprising an external regulator port, wherein the select module is adapted to sequentially enable and disable one or more external regulators coupled to the external regulator port based on instructions of the first user programmable script.

14. The programmable power distributing sequencer of claim 2, further comprising a port, wherein the controller is adapted to control a second power distributing sequencer coupled to the port based on instructions of the first user programmable script.

15. The programmable power distributing sequencer of claim 2, wherein the controller is further adapted to:
    receive a second user programmable script including instructions to sequentially enable and disable the regulators;
    store the second user programmable script in the first memory; and
    enable and disable the regulators based on the instructions of the second user programmable script.

16. The programmable power distributing sequencer of claim 2, further comprising a fault detection module adapted to detect a faulty operation of one or more of the regulators.

17. The programmable power distributing sequencer of claim 16, wherein the fault detection module is adapted to communicate an identity of the one or more faulty operating regulators to the controller.

18. The programmable power distributing sequencer of claim 17, wherein the controller is adapted to send a notification of the one or more faulty operating regulators.

19. The programmable power distributing sequencer of claim 17, wherein the controller is adapted to sequentially disable the regulators in response to receiving the communication from the fault detection module.

20. The programmable power distributing sequencer of claim 19, wherein the controller is adapted to sequentially disable the regulators based on instructions from the first user programmable script.

21. The programmable power distributing sequencer of claim 1, wherein the sequencer module comprises a plurality of sequence generators adapted to respectively generate the timing sequences.

22. The programmable power distributing sequencer of claim 21, further comprising a first set of registers adapted to provide information respectively to the sequence generators on how to generate the respective timing sequences.

23. The programmable power distributing sequencer of claim 22, wherein the select module comprises:
a plurality of select logic devices for generating the enable and disable signals respectively for the regulators; and
a second set of registers adapted to provide information respectively to the select logic devices on the respective timing sequences and respective time slots to use to generate the enable and disable signals respectively for the regulators.

24. A method of sequentially enabling and disabling a plurality of internal regulators, comprising:
accessing a user programmable script including instructions for sequentially enabling and disabling the internal regulators;
generating a plurality of predetermined start-up timing sequences based on the instructions of a user programmable script;
enabling and disabling the internal regulators based on a plurality of predetermined start up timing sequences; and
receiving from a feedback loop updates for the plurality of predetermined start-up timing sequences based at least in part on information related to at least one of the plurality of internal regulators.

25. The method of claim 24, further comprising receiving the user programmable script from a programming source.

26. The method of claim 25, further comprising enabling one or more internal regulators coupled to the programming source based on instructions from a default script.

27. The method of claim 25, wherein the programming source comprises an external programming device, a memory, or an applications processor.

28. The method of claim 24, further comprising enabling and disabling one or more external regulators based on the instructions of the user programmable script.

29. The method of claim 24, further comprising controlling an external power distributing sequencer based on the instructions of the user programmable script.

30. The method of claim 24, further comprising detecting a faulty operation of one or more internal regulators; and
sending a notification of the faulty operating one or more internal regulators in response to detecting the faulty operation of the one or more internal regulators.

31. The method of claim 24, further comprising detecting a faulty operation of one or more internal regulators; and
disabling one or more of the internal regulators in response to detecting the faulty operation of the one or more internal regulators.

32. An electronic system, comprising:
an applications processor;
an external memory coupled to the applications processor;
one or more modules; and
a programmable power distributing sequencer, comprising:
a first set of regulators coupled to the applications processor;
a second set of regulators coupled to the external memory;
a third set of regulators coupled to the one or more modules;
an internal memory adapted to store a user programmable script including instructions for enabling and disabling the regulators of the first, second, and third sets in a sequential manner;
a sequencer module that generates a plurality of predetermined start-up timing sequences based on instructions of the user programmable script;
a select module adapted to generate enable and disable signals respectively for the regulators of the first, second, and third sets based on the plurality of predetermined start-up timing sequences; and
a feedback loop that couples information to the sequencer module that updates the plurality of the predetermined start-up timing sequences based at least in part on information related to at least one of plurality of regulators.

33. A sequencer, comprising:
a first group of regulators;
a timing sequence generator to generate a predetermined start-up timing sequence control signal;
a select module coupled to a regulator in the first group of regulators, the select module adapted to apply a first control signal including timing information for controlling an enabling and disabling of the group of regulators;
a pulse detector for each regulator, wherein the pulse detector is adapted to detect pulses in the first control signal that controls the enabling and disabling of the corresponding regulator;
a controller adapted to:
reassign one or more of the regulators in the first group to a second group of regulators; and
apply a second control signal to the second group of regulators for controlling the enabling and disabling of the second group of regulators,
wherein the first and second control signals respectively comprise pulses at distinct frequencies to govern the enabling and disabling of the first and second group of regulators in distinct manners.

* * * * *